United States Patent Office.

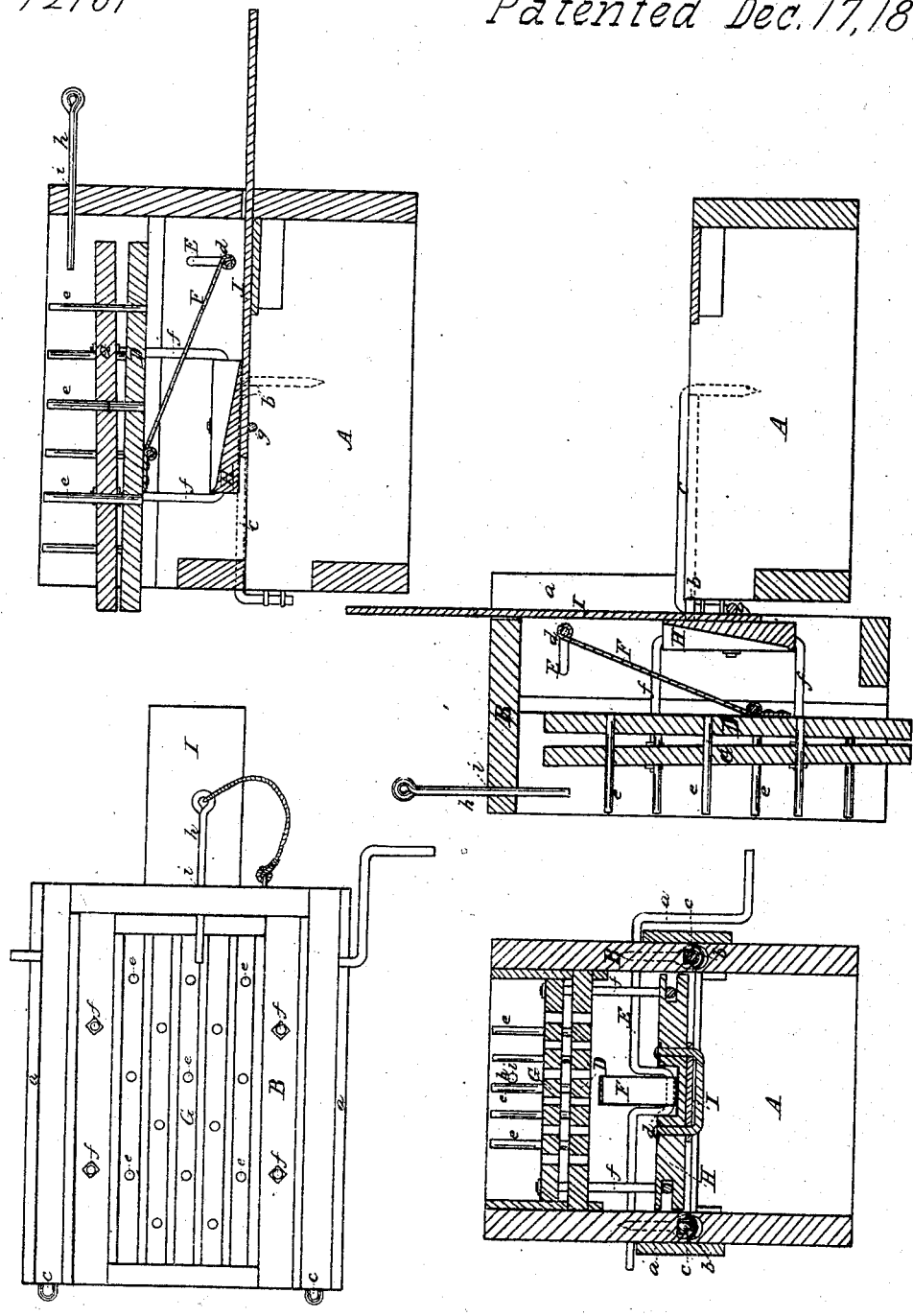

SEWALL BRACKETT, OF JAMAICA PLAIN, MASSACHUSETTS.

Letters Patent No. 72,161, dated December 17, 1867; antedated December 4, 1867.

---

IMPROVED MACHINE FOR SEPARATING ROOTS FROM PEAT.

---

*The Schedule referred to in these Letters Patent and making part of the same.*

---

TO ALL PERSONS TO WHOM THESE PRESENTS MAY COME:

Be it known that I, SEWALL BRACKETT, of Jamaica Plain, in the county of Norfolk, and State of Massachusetts, have invented a new and useful Machine for Separating Roots and Foreign Matters from Peat; and I do hereby declare the same to be fully described and represented in the following specification and the accompanying drawings, of which—

Figure 1 is a top view,

Figure 2 a longitudinal section, and

Figure 3 a transverse section of it.

Figure 4 is a longitudinal section of it, showing the positions of its parts while discharging the roots, &c., separated from the peat.

In such drawings, A is the peat-receiver, which is a rectangular box. On the said box A, and so as to be capable of being slid lengthwise thereon, is another box or carriage, B, which is arranged between parallel guides $a\ a$, projecting up from opposite sides of the box A. The carriage B is connected to the box A, near one side thereof, by means of a staple, $b$, and a rod, $c$, going through the staple. The said rod is fixed in and arranged with respect to the box A, in manner as shown in figs. 2 and 4. A grate, D, is placed within the carriage B, and so applied thereto as to be capable of being moved longitudinally back and forth therein, by means of a cranked shaft, E, and a connecting-rod, F, such rod being jointed to the grate, and also to a bell-crank, $d$, projecting from the shaft E. A series of pins, $e\ e\ e$, &c., is erected on the grate D, and so as to extend vertically therefrom and through the bars of another or supplementary grate, G, laid on the primary grate D. The supplementary grate is connected with a cross-bar, H, by means of uprights or rods $f\ f\ f\ f$ going through holes in the primary grate. The bar H rests on and is connected with a lever, I, by means of a staple, $g$, which clasps the lever, and is inserted in the bar. The lever rests on the rear part of the box A. By pressing the rear end of the lever I downward, the supplementary grate may be elevated up to the tops of the series of pins $e$. It may be preserved in its elevated position as long as may be desirable by means of a pin or bolt, $h$, which goes through a hole, $i$, in the rear end of the carriage B, and extends underneath the supplementary grate.

In using the machine, the peat in a dry and crumbling state is to be thrown upon the supplementary grate, and the pins $e\ e$ projecting above it, the cranked shaft being in revolution so as to produce quick reciprocating longitudinal movements of the two grates. This will cause the peat to fall through the spaces between the bars of the grates and into the receiver A, the roots and foreign matters remaining on the supplementary grate. After the peat may have been sufficiently discharged from the roots, the supplementary grate should be forced upward, and the carriage B should be moved forward on the receiver A, and tipped down into the inclined position shown in fig. 4, so as to discharge from the supplementary grate the mass of roots and matters which may have accumulated thereon.

What I claim as my invention, is—

The combination and arrangement of the carriage B, the main and supplementary grates D G, the series of pins $e$, mechanism for raising the supplementary grate on the pins, and mechanism for imparting to the main and supplementary grates, reciprocating longitudinal movements as set forth, these mechanisms being the lever I, the bar H, and the uprights $f$, and the cranked shaft E and connecting-rod F.

I also claim the combination and arrangement of the whole and the peat-receiver A, as set forth, the said peat-receiver and the carriage B being connected by means substantially as explained.

SEWALL BRACKETT.

Witnesses:
R. H. EDDY,
F. P. HALE, Jr.